# United States Patent [19]

Allison

[11] 3,733,087
[45] May 15, 1973

[54] INDEPENDENT SUSPENSION SYSTEM FOR A MOTOR VEHICLE

[75] Inventor: William D. Allison, Grosse Pointe Farms, Mich.

[73] Assignee: Ford Motor Company, Dearborn, Mich.

[22] Filed: Dec. 21, 1970

[21] Appl. No.: 100,114

[52] U.S. Cl. ............ 280/96.2 R, 267/57, 280/124 B
[51] Int. Cl. ........................................... B62d 7/08
[58] Field of Search .................. 280/96.2, 124 B, 280/96.1; 267/57, 154

[56] References Cited

UNITED STATES PATENTS

| 3,202,236 | 8/1965 | Allison | 280/124 B X |
| 2,674,450 | 4/1954 | Frank | 280/96.2 R X |
| 3,037,789 | 6/1962 | Allison | 267/57 X |
| 2,871,505 | 2/1959 | Clark et al. | 267/154 X |
| 3,446,514 | 5/1969 | Allison | 280/124 B |
| 3,116,071 | 12/1963 | Wilfert et al. | 280/124 B |
| 3,257,123 | 6/1966 | Giovinazzo | 280/96.2 R X |
| 3,333,653 | 8/1967 | Eirhart, Jr. | 280/96.2 X |
| 3,278,196 | 10/1966 | Van Winsen | 280/96.2 R |
| 3,033,587 | 5/1962 | Perish | 280/96.2 R |

FOREIGN PATENTS OR APPLICATIONS 915,989 1/1963 Great Britain .................. 280/96.2 R Primary Examiner—Leo Friaglia
Assistant Examiner—John P. Silverstrim
Attorney—John R. Fajlkner and Clifford L. Sadler

[57] ABSTRACT

An independent suspension system for a motor vehicle having left and right wheels each positioned laterally by a suspension arm and guided vertically by a telescopic strut. A plurality of torsion springs interconnects the left and right suspension arms and is constructed to function as the main suspension spring, as an anti-roll stabilizer and as the struts positioning the suspension arms longitudinally in the vehicle.

8 Claims, 4 Drawing Figures

INVENTOR
WILLIAM D. ALLISON
BY John R. Faulkner
Clifford L. Sadler
ATTORNEYS

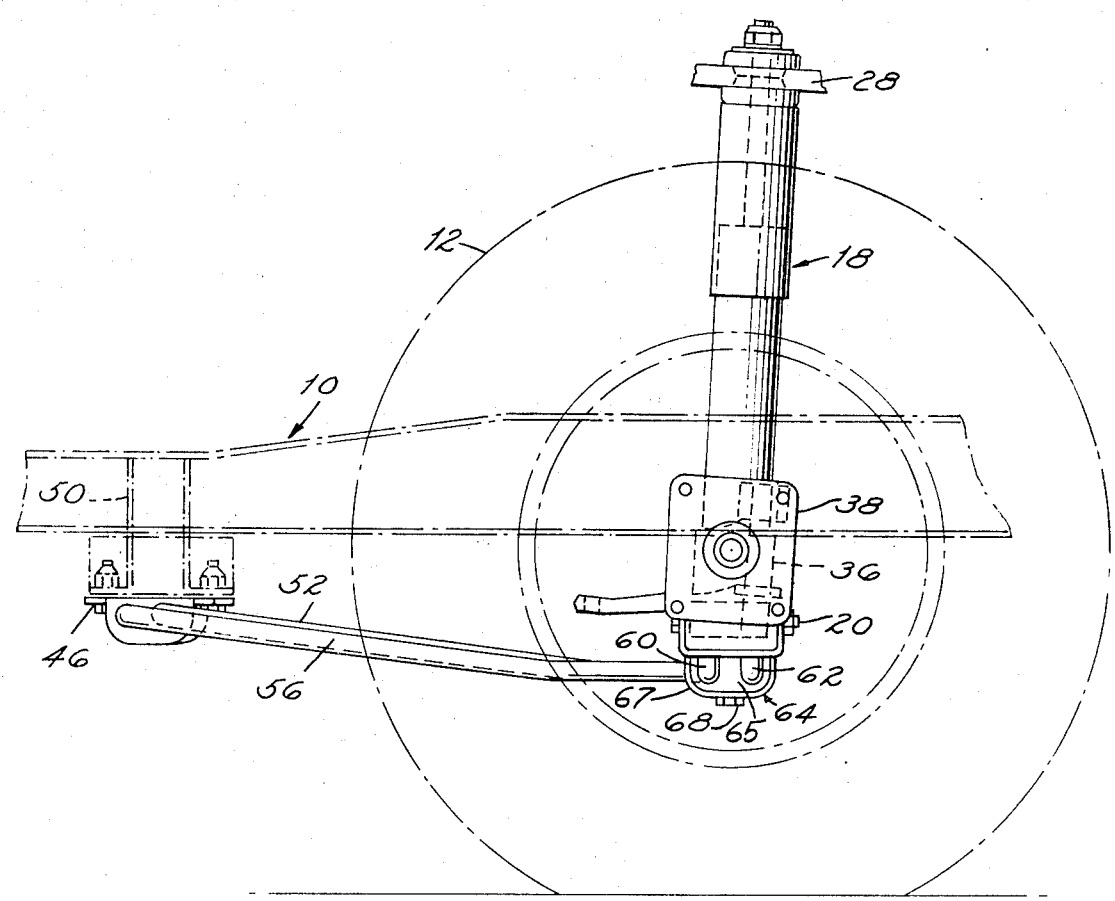

INDEPENDENT SUSPENSION SYSTEM FOR A MOTOR VEHICLE

BACKGROUND OF THE INVENTION

The present invention relates to independent front suspension systems for motor vehicles. In one construction of the invention, the path of the vehicle wheel during jounce and rebound movement is guided in part by a telescopic pillar.

In addition, a multipurpose torsion spring means interconnects the left and right wheel suspensions.

BRIEF SUMMARY OF THE DISCLOSURE

In the presently preferred embodiment of this invention, an independent front suspension system is provided having a pair of laterally extended suspension arms. The arms are pivotally connected to the vehicle frame. A telescopic pillar is pivotally connected to the outer end of each arm and his its upper end connected to body support structure. The lower end of the pillar carries a king pin which pivotally supports the wheel spindle.

A pair of torsion bar springs interconnect the left and right suspension arms. The springs follow a parallel path and are supported on the vehicle frame at spaced points forward of the suspension arms. The spring bars extend longitudinally from the frame supports to the suspension arms where they are secured.

The torsion bars serve a plurality of functions. The bars provide the principal resilient support for the chassis upon the suspension arms. The springs also provide an anti-roll stabilizer function. Finally, the spring bars function as struts to control the longitudinal position of the suspension arms.

BRIEF DESCRIPTION OF THE DRAWINGS

The many objects and advantages of an independent suspension system constructed in accordance with this invention will become apparent upon consideration of the following detailed discussion and the accompanying drawings, in which:

FIG. 2 is a side elevational view of the suspension system of FIG. 1;

DETAILED DESCRIPTION OF A PREFERRED EMBODIMENT

Figure 1:
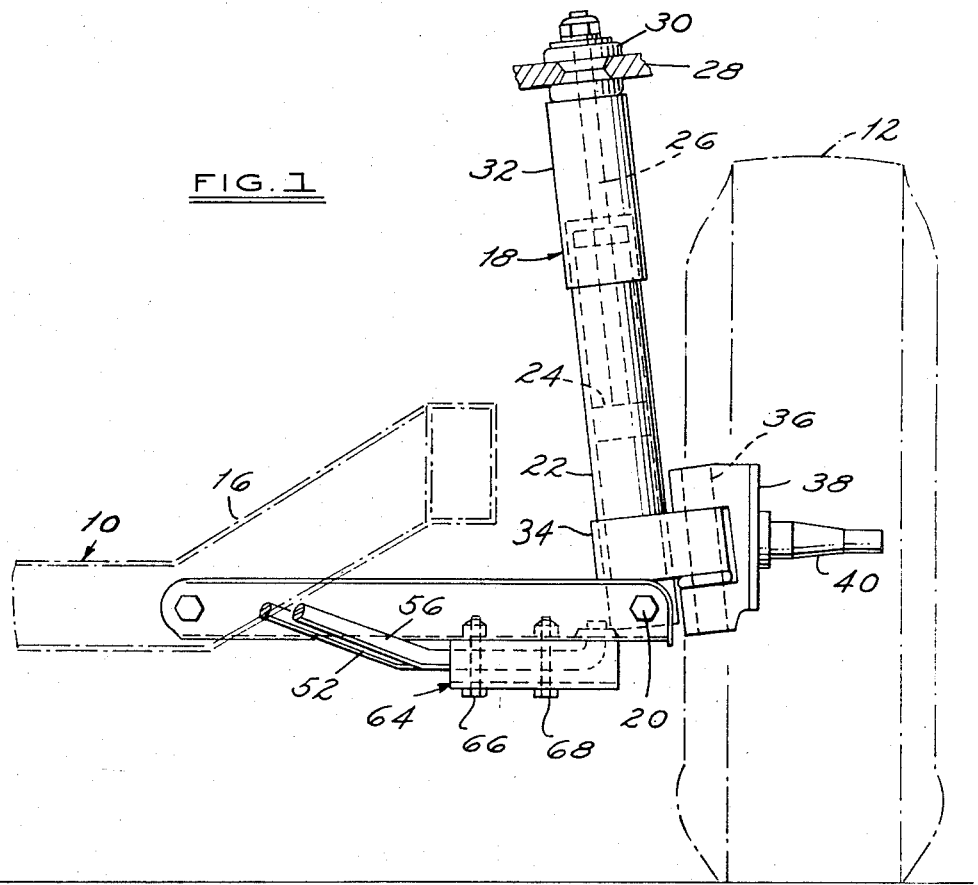
FIG. 1 is a front elevational view of an independent front suspension system for a motor vehicle constructed in accordance with this invention.

Referring to the drawings for a detailed description of the presently preferred embodiment, FIG. 1 discloses an independent suspension system for a motor vehicle. The suspension system of FIG. 1 includes a vehicle frame 10, right and left dirigible road wheels 11 and 12 and suspension means interconnecting the wheels with the frame.

The suspension means includes a left suspension arm 14 having its inner end pivotally connected to a frame cross member 16 by a pivot means 17. A telescopic strut 18 has its lower end connected to the suspension arm 14 by a pivot 20.

The strut 18 includes a cylinder 22 in which a piston 24 is slidably supported. A piston rod 26 extends upwardly from the piston 24 and has its upper end secured to body structure 28 by means of a resilient connection. The resilient connection includes rubber bushings 30. A dust tube 32 surrounds the piston rod 26 and protects it from contamination. The strut 18 is constructed to function as a hydraulic shock absorber.

A casting 34 is secured to the lower end of the strut 18 and provides a support for a king pin 36. A steering knuckle 38 is pivotally supported by the king pin 36 and includes a spindle 40 on which the wheel 12 is rotatably mounted.

The foregoing description presents the suspension construction at the left side of the vehicle. The suspension for the right is similarly constructed.

In accordance with the present invention, means are provided to support the vehicle frame 10 upon the suspension arms, to control body roll and to control the longitudinal position of the suspension arms. In accordance with this invention, a pair of torsion bar springs 42 and 44 are provided. The bars 42 and 44 have transversely extending midportions 45 and 47 which are journalled in rubber bushings 46 and 48. The bushings are secured to a frame cross member 50.

Each of the bars 42, 44 is provided with longitudinally extending left and right-hand portions. These portions of bar 42 are identified by reference numerals 52 and 54 while the longitudinal portions of bar 44 are identified by reference numerals 56 and 58. The ends of the left longitudinal bar portions 52 and 56 are bent outwardly in a lateral direction to provide portions 60 and 62 that extend parallel to the left suspension arm 14. As seen in FIGS. 1 and 2, the tips of the bars are turned upwardly and extend through openings in the sheet metal forming the arm structure. A clamp assembly 64 secures the bar portions 60 and 62 to the arm 14 by means of bolts 66 and 68. The clamp assembly 64 includes a rubber element 65 that engages the bar ends 60, 62 and is enclosed by a channel-shaped member 67.

The structure at the right side of the vehicle is generally similar. The right suspension arm 70 extends laterally from its frame pivot 72. The longitudinal bar portions 54 and 58 are formed with ends 74 and 76 that are angled laterally outwardly parallel to the suspension arm 70. The bar ends 74 and 76 are secured to the suspension arm 70 by means of a clamp assembly 78 and bolts 80 and 82.

Figure 4:
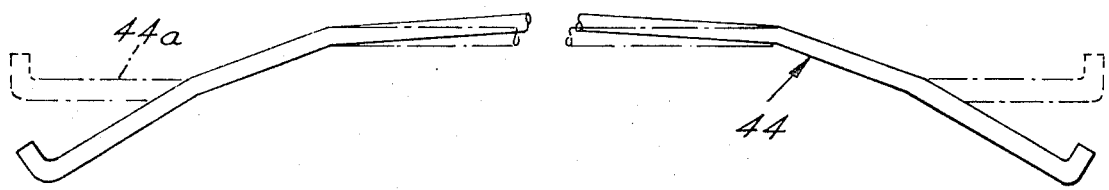
FIG. 4 is a front elevational view of one of the torsion bar springs of FIG. 1.
Figure 3:
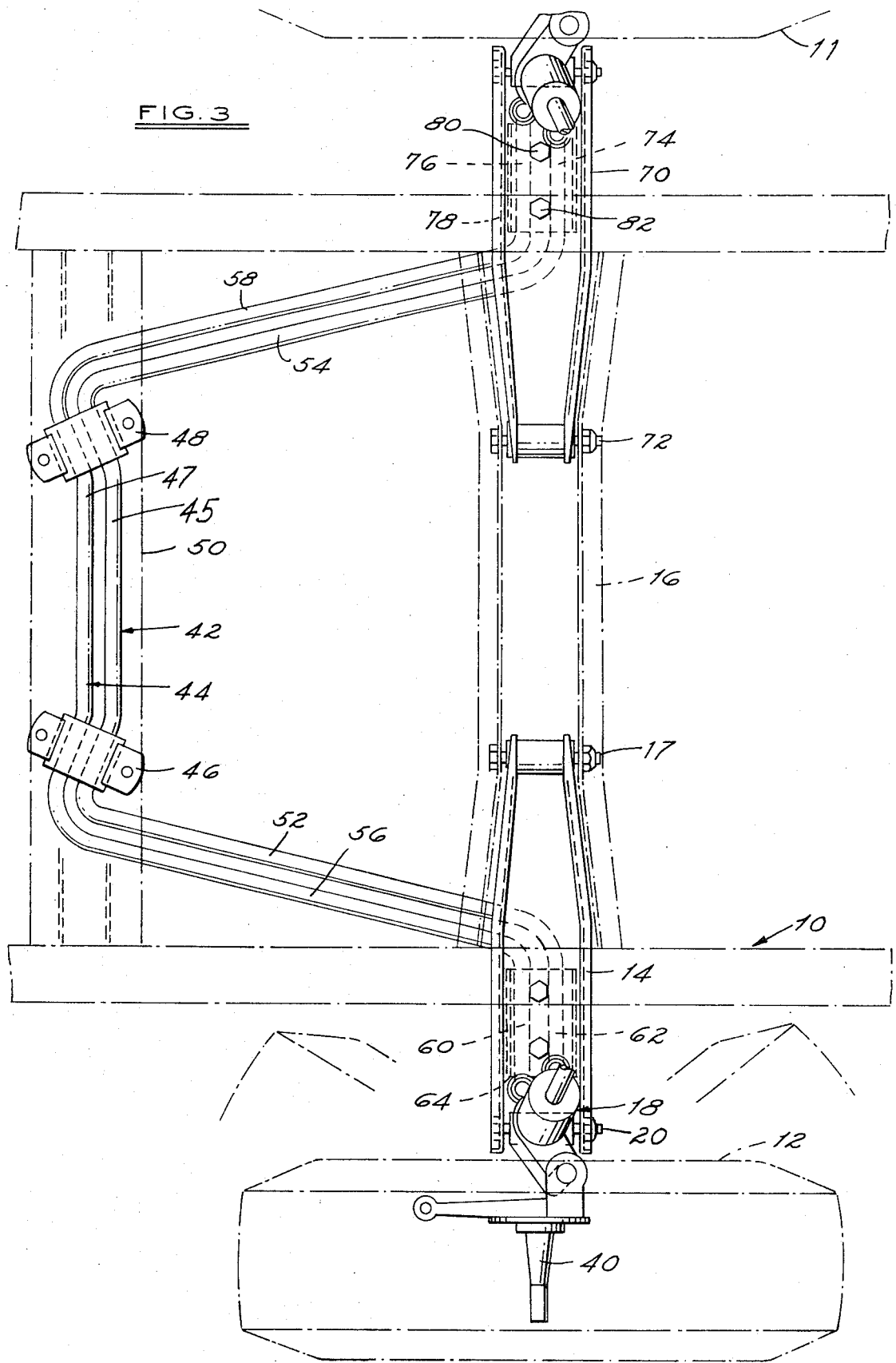
FIG. 3 is a top plan view of the suspension system of FIG. 1.

FIG. 4 shows a front elevational view of bar 44. The full line portion of the drawing discloses the configuration of the bar 44 prior to installation in a vehicle. When the bar is secured to the frame 10 by the bushings 46 and 48 and to the suspension arms 14 and 70 by the clamps 64 and 78, it assumes the dotted-line configuration 44a. The internal stressing of the bar to the 44a configuration provides the force that resiliently supports the chassis 10 upon the suspension arms 14 and 70.

OPERATION

In summary, the presently preferred embodiment of this invention provides a pillar suspension for the dirigible wheels 11, 12 with the king pin supported spindle 40 mounted outwardly on the lower end of the pillar 18. The base of the pillar 18 is hinged to the outer end of the lateral suspension arm 14 which is pivoted at its inner end to the frame cross member 16 for vertical actuation. The upper end of the telescopic pillar 18 is attached to the body frame structure 28. The pillar 18 may include resilient compression means in addition to hydraulic shock absorber structure whereby the pillar 18 may support a portion of the vehicle load.

Longitudinal location of the outer end of the left lower arm 14 is provided by the spring steel bars 42, 44 attached to the arm in a manner to torsionally deflect the forwardly extending portions of the bar in response to vertical wheel movement. The bars 42, 44 extend across the vehicle and continue to a symmetrically opposite attachment to the right side suspension arm 70. The forward transverse sections of the bars 42, 44 are secured to the frame member 50 by the spaced resilient bushings 46, 48.

The outer end sections of the bars 42, 44 are forged at an angle in the free state (see FIG. 4) to provide the desired loading on the wheels at designed height by torsion deflection of the forwardly extending sections of the bars. Use of two or more bars as shown provides a backup system for wheel location in the event of a bar failure due to imperfect material or corrosion.

In addition to functioning as torsion springs and drag struts, the bars also work as anti-roll stabilizers. The longitudinal spring sections act as lever arms to torsionally deflect the transverse center sections during roll conditions.

In the wheel spindle illustrated, the axes of the king pins are displaced rearwardly of the wheel spindle and given a caster angle to provide a ground intersection point essentially opposite the center of the tire contact area. This arrangement provides benefits in maximum turn wheel positions with Ackermann steering, space within the wheel rim for a forwardly extending steering arm and camber tilt toward the inside on turns. The telescopic pillar in the side view (FIG. 2) shows an angle slightly to the rear as it extends upwardly. This angle provides a modest anti-dive effect on forward brake application.

The total suspension package is characterized by light weight, optimum use of space, low cost and good performance.

The foregoing description presents the presently preferred embodiment of this invention. Modifications and alterations may occur to those skilled in the art that will come within the scope and spirit of the following claims.

I claim:

1. An independent suspension system for a motor vehicle comprising a vehicle frame,
   left and right steerable road wheels and suspension means interconnecting said wheels and said frame,
   said suspension means comprising mutually independent left and right wheel support members rotatably supporting said left and right road wheels,
   left and right suspension arms connected to said left and right wheel support members, respectively, and to said frame,
   a plurality of torsion bars having generally parallel transversely extending midportions mounted on said vehicle frame,
   said bars having laterally extending end portions,
   means rigidly securing said end portions to said suspension arms adjacent the outer ends of said arms,
   said bars having longitudinally extended strut portions interconnecting said end portions and said transverse portions,
   said bars being constructed to position said suspension arms longitudinally,
   said bars being preloaded in torsion to resiliently support said frame on said suspension arms, and
   said bars being constructed to resiliently resist angular displacement of said frame about a longitudinal roll axis.

2. An independent suspension system for a motor vehicle comprising a vehicle frame,
   left and right steerable road wheels and suspension means interconnecting said wheels and said frame,
   said suspension means comprising mutually independent left and right wheel support members rotatably supporting said left and right road wheels,
   left and right suspension arms pivotally connected to said left and right wheel support members at one of their ends and to said frame at the other of their ends,
   torsion bar means having a transversely extending midportion mounted on said vehicle frame,
   said transverse midportion being longitudinally spaced from the axis of rotation of said wheels,
   said bar means having laterally outwardly extending end portions,
   clamping means rigidly securing said end portions to said arms adjacent the outer ends of said arms,
   said bar means having longitudinally extended strut portions interconnecting said end portions and said transverse portion,
   said bar means being constructed to position said suspension arms longitudinally,
   said bars being preloaded in torsion to resiliently support said chassis on said suspension arms, and
   said bars being constructed to resiliently resist angular displacement of said frame about a longitudinal roll axis.

3. An independent suspension system for a motor vehicle comprising a vehicle frame,
   left and right steerable road wheels and suspension means interconnecting said wheels and said frame,
   said suspension means comprising mutually independent left and right wheel support members rotatably supporting said left and right road wheels,
   left and right suspension arms interconnecting said left and right wheel support members and said frame,
   a plurality of torsion bars arranged in generally side-by-side fashion and having generally parallel transversely extending midportions mounted on said vehicle frame,
   said transverse midportions being longitudinally spaced from the axis of rotation of said wheels,
   said bars having laterally extending end portions,
   means rigidly securing said end portions to said suspension arms adjacent the outer ends of said arms,
   said bars having generally parallel longitudinally extended strut portions interconnecting said end portions and said transverse portions,
   said bars being constructed to position said suspension arms longitudinally,
   said bars being preloaded in torsion to resiliently support said chassis on said suspension arms, and
   said bars being constructed to resiliently resist angular displacement of said frame about a longitudinal roll axis.

4. An independent suspension system for a motor vehicle according to claim 3 and including:
   left and right telescopic pillars interconnecting said wheel support members and said vehicle frame.

5. An independent suspension system for a motor vehicle according to claim 3 and including:

said transverse midportions being longitudinally spaced from the axis of rotation of said wheels in a forward direction.

6. An independent suspension system for a motor vehicle comprising a vehicle frame, left and right road wheels and suspension means interconnecting said wheels and said frame, said suspension means comprising mutually independent left and right wheel support members rotatably supporting said left and right road wheels, left and right suspension arms interconnecting said left and right wheel support members and said frame, a plurality of torsion bars arranged in generally side-by-side fashion and having generally parallel transversely extending midportions mounted on said vehicle frame, said transverse midportions being longitudinally spaced from the axis of rotation of said wheels, said bars having laterally extending end portions connected to said suspension arms adjacent the outer ends of said arms, said arms having a plurality of openings, the tips of said end portions being angled upwardly and extending through said openings, clamping means securing said end portions to said arms, said bars having generally parallel longitudinally extended strut portions interconnecting said end portions and said transverse portions, said bars being constructed to position said suspension arms longitudinally, to resiliently support said chassis on said suspension arms and to resiliently resist angular displacement of said frame about a longitudinal roll axis.

7. An independent suspension system for a motor vehicle comprising a vehicle frame, left and right road wheels and suspension means interconnecting said wheels and said frame, said suspension means comprising mutually independent left and right wheel support members rotatably supporting said left and right road wheels, left and right suspension arms interconnecting said left and right wheel support members and said frame, a plurality of torsion bars arranged in generally side-by-side fashion and having generally parallel transversely extending midportions mounted on said vehicle frame, said transverse midportions being longitudinally spaced from the axis of rotation of said wheels, said bars having laterally extending end portions connected to said suspension arms adjacent the outer ends of said arms, left and right telescopic pillars interconnecting said wheel support members and said vehicle frame, said arms having a plurality of openings, the tips of said end portions being angled upwardly and extending through said openings, clamping means securing said end portions to said arms, said bars having generally parallel longitudinally extended strut portions interconnecting said end portions and said transverse portions, said bars being constructed to position said suspension arms longitudinally, to resiliently support said chassis on said suspension arms and to resiliently resist angular displacement of said frame about a longitudinal roll axis.

8. An independent suspension system for a motor vehicle comprising a vehicle frame, left and right steerable road wheels and suspension means interconnecting said wheels and said frame, said suspension means comprising mutually independent left and right wheel support members rotatably supporting said left and right road wheels, left and right suspension arms pivotally connected to said left and right wheel support members at one of their ends and to said frame at the other of their ends, left and right telescopic guide pillars interconnecting said wheel support members and said vehicle frame, said pillars and said suspension arms defining the jounce and rebound path for said wheels, a plurality of torsion bars arranged in generally side-by-side fashion and having generally parallel transversely extending midportions, rubber bushing means securing said transverse portions to said frame, said transverse midportions being longitudinally spaced from the axis of rotation of said wheels in a forward direction, said bars having laterally extending end portions connected to said suspension arms adjacent the outer ends of said arms, said arms having a plurality of openings, the tip of each of said end portion being angled upwardly and extending through said openings, clamping means securing said end portions to said arms, said bars having generally parallel longitudinally extended strut portions interconnecting said end portions and said transverse portions, said bars being constructed to position said suspension arms longitudinally, to resiliently support said chassis on said suspension arms and to resiliently resist angular displacement of said frame about a longitudinal roll axis.

* * * * *

UNITED STATES PATENT OFFICE
CERTIFICATE OF CORRECTION

PATENT NO. : 3,733,087
DATED : May 15, 1973
INVENTOR(S) : William D. Allison

It is certified that error appears in the above-identified patent and that said Letters Patent are hereby corrected as shown below:

Column 4, line 1, change "chassis" to -- frame --;

line 61, change "chassis" to -- frame --.

Column 5, line 35, change "chassis" to -- frame --.

Column 6, line 13, change "chassis" to -- frame --;

line 53, change "chassis" to -- frame --.

Signed and Sealed this second Day of September 1975

[SEAL]

Attest:

RUTH C. MASON
Attesting Officer

C. MARSHALL DANN
Commissioner of Patents and Trademarks